(12) United States Patent
Novak et al.

(10) Patent No.: US 9,737,867 B2
(45) Date of Patent: Aug. 22, 2017

(54) CHEMICAL MANUFACTURING SYSTEM

(71) Applicants: Reno Lee Novak, Poplar Grove, IL (US); Shannon E. Brandt, Machesney Park, IL (US)

(72) Inventors: Reno Lee Novak, Poplar Grove, IL (US); Shannon E. Brandt, Machesney Park, IL (US)

(73) Assignee: Nova-Kem, LLC, Germantown, WI (US)

( * ) Notice: Subject to any disclaimer, the term of this patent is extended or adjusted under 35 U.S.C. 154(b) by 819 days.

(21) Appl. No.: 13/763,499

(22) Filed: Feb. 8, 2013

(65) Prior Publication Data

US 2013/0202492 A1     Aug. 8, 2013

Related U.S. Application Data

(60) Provisional application No. 61/596,706, filed on Feb. 8, 2012.

(51) Int. Cl.
*B01J 19/24*     (2006.01)

(52) U.S. Cl.
CPC ........... *B01J 19/24* (2013.01); *B01J 19/2445* (2013.01); *B01J 2219/0002* (2013.01); *B01J 2219/00015* (2013.01); *B01J 2219/00063* (2013.01); *B01J 2219/1923* (2013.01)

(58) Field of Classification Search
CPC ....................................................... B01J 19/24
USPC ........................................................ 422/111
See application file for complete search history.

(56) References Cited

U.S. PATENT DOCUMENTS

2009/0117242 A1 *   5/2009   Kateman .................. A23G 9/08
                                                                                      426/474

FOREIGN PATENT DOCUMENTS

WO     WO 2011092669 A1 *   8/2011

* cited by examiner

*Primary Examiner* — Walter D Griffin
*Assistant Examiner* — Huy-Tram Nguyen

(57) ABSTRACT

A chemical manufacturing system is used in chemical reactions involving a gas, gases or liquid which is turned into a gas, reacting with a solid or liquid, inside a closed reactor system. The chemical manufacturing system is designed to produce highly reactive materials on an industrial scale in a controllable fashion. The modular design and shape of the reactor system and the controls of the system account for the differentiation and improvements over conventional reactor systems.

17 Claims, 3 Drawing Sheets

CHEMICAL MANUFACTURING SYSTEM

CROSS-REFERENCE TO RELATED APPLICATION

This application claims the benefit of priority of U.S. provisional application No. 61/596,706, filed Feb. 8, 2012, the contents of which are herein incorporated by reference.

BACKGROUND OF THE INVENTION

The present invention relates to chemical manufacturing systems and, more particularly, to a chemical manufacturing system involving a gas, gases, or liquid which is turned into a gas, reacting with a solid or liquid, inside a closed reactor system.

Chemical reactions are often initially worked out on a small, bench-top scale. At this scale, it can be relatively easy to work with a variety of materials, including highly reactive materials as reagents or products. For example, many highly reactive materials may react exothermically and often, it is desirable to maintain the reaction at a given temperature or within a predetermined temperature range. This can be performed by controlling the quantity of material flowing into a reaction vessel, for example. In some situations, a highly reactive material may be produced and its collection controlled and contained.

When the bench scale is scaled up to a pilot plant or manufacturing scale, often involving hundreds of kilograms of product, highly reactive substances can be more difficult to handle and control. For example, as reactions are scaled up, the reaction volumes (number of moles of reagent reacted over a given time) are often similarly increased, often resulting in increased exotherm that can become difficult to control to keep the reaction temperature within a desired reaction temperature range.

Moreover, with conventional reactor systems, the systems are often designed in an integrated fashion, where, should one component need changing or replacement, it could result in the need for replacing the entire reactor. Without a modular design, it can be a labor-intensive and time-consuming task to repair these conventional reactor systems.

As can be seen, there is a need for an improved chemical manufacturing system that can help overcome shortcomings of conventional chemical reactor systems.

SUMMARY OF THE INVENTION

In one aspect of the present invention, a chemical reactor comprises a reactor body; a reactor face sealing an open face of the reactor body; one or more reactor trays disposed in the reactor body; one or more thermowells for measuring temperature of a reagent in the one or more reactor trays; and valves to control the inlet of reagent into the reactor body and outlet of product from the reactor body, wherein the reactor body is a sealed system.

In another aspect of the present invention, a chemical reactor system comprises a reactor body; a reactor face sealing an open face of the reactor body; one or more reactor trays disposed in the reactor body; one or more thermowells for measuring temperature of a reagent in the one or more reactor trays; valves to control the inlet of reagent into the reactor body and outlet of product from the reactor body, wherein the reactor body is a sealed system; one or more process gas containers and one or more purge gas containers fluidly connected to an inlet of the reactor body; a mass flow controller for measuring flow of material into the reactor body; and a collection vessel for collection reaction products and byproducts from the reactor body.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides a chemical manufacturing system for use in chemical reactions involving a gas, gases or liquid which is turned into a gas, reacting with a solid or liquid, inside a closed reactor system. The chemical manufacturing system is designed to produce highly reactive materials on an industrial scale in a controllable fashion. The modular design and shape of the reactor system and the controls of the system account for the differentiation and improvements over conventional reactor systems.

Referring to FIGS. 1 through 4, a chemical reactor 10 is designed as a closed system with a reactor body 12 and a removable reactor face 14. The reactor face 14 can sealing engage with the reactor body 12 to prevent escape of gases or liquids from the reactor 10. Typically, a gasket, such as an O-ring gasket 16, can be used to help seal the reactor face 14 to the reactor body 12. A groove can be cut around an inside wall of the reactor face 14 for the O-ring gasket 16 to seat. The groove can be a sufficient diameter to snugly fit the O-ring gasket 16 and which will allow the O-ring gasket 16 to seal against the reactor body front sealing surface.

Figure 1:
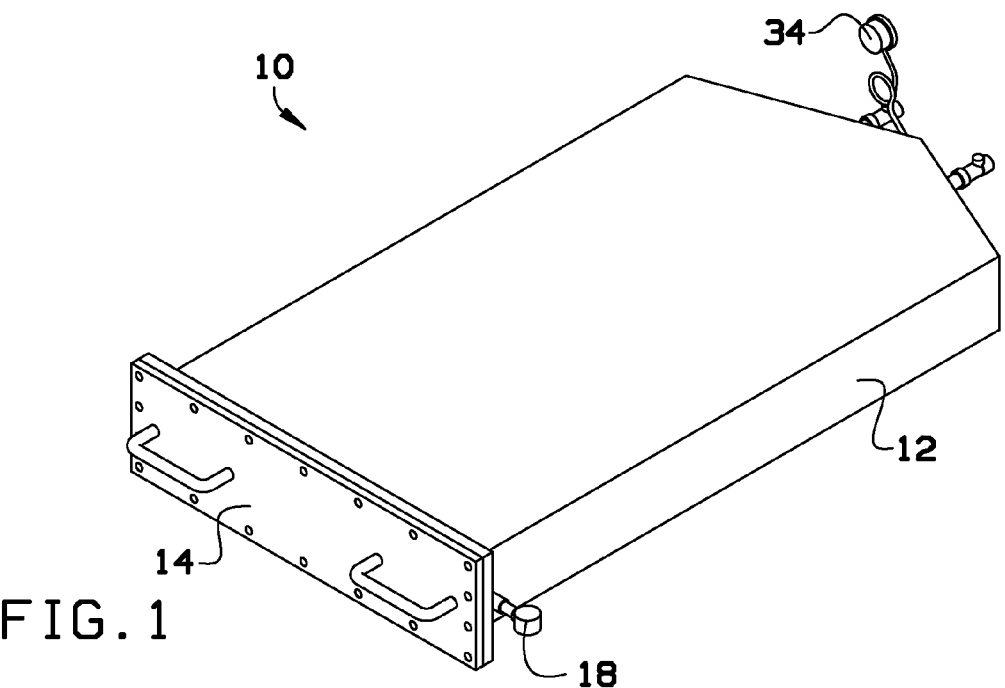
FIG. 1 is a perspective view of a reactor used in a chemical manufacturing system according to an exemplary embodiment of the present invention.
Figure 2:
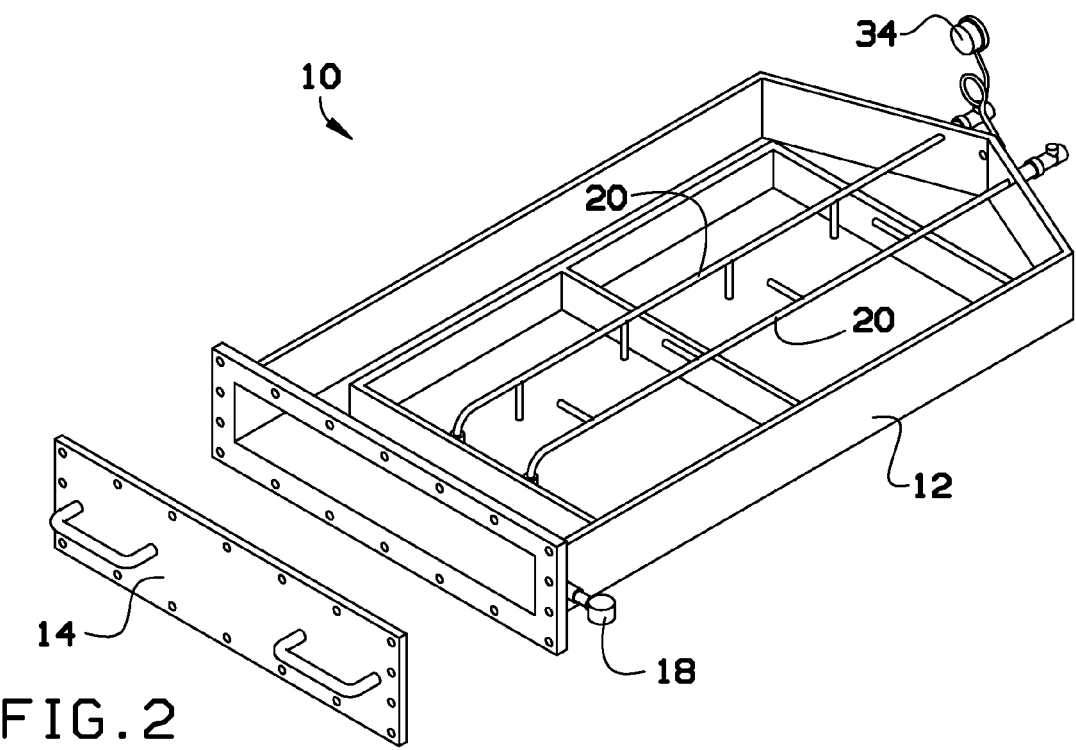
FIG. 2 is a partially exploded perspective view of the reactor of FIG. 1.
Figure 3:
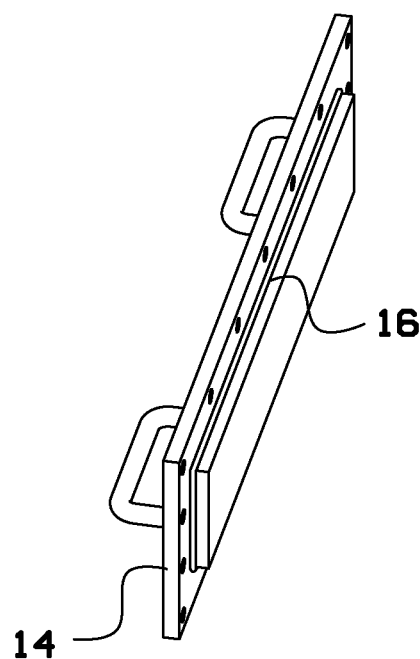
FIG. 3 is a perspective view of a reactor face of the reactor of FIG. 1.
Figure 4:
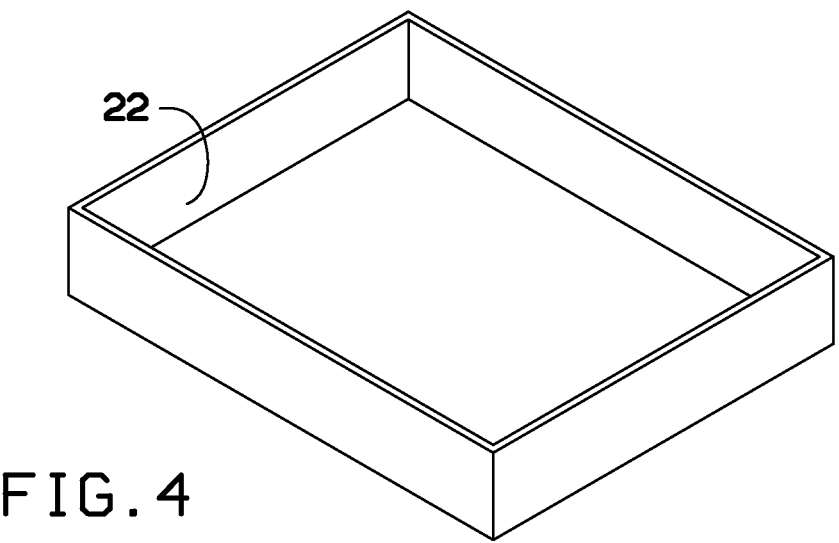
FIG. 4 is a perspective view of a reactor tray of the reactor of FIG. 1.

One or more reactor trays 22 (two reactor trays 22 are shown in FIG. 2) can be disposed inside the reactor body 12. The reactor trays 22 can be used to hold a desired amount of starting material, such as a liquid or solid reagent, and any byproducts formed from the reaction. The reactor trays 22 can be removed from the reactor body 12 so it can be emptied through the reactor face 14 after a batch to remove any byproducts and refilled with starting material for the next batch.

Figure 5:
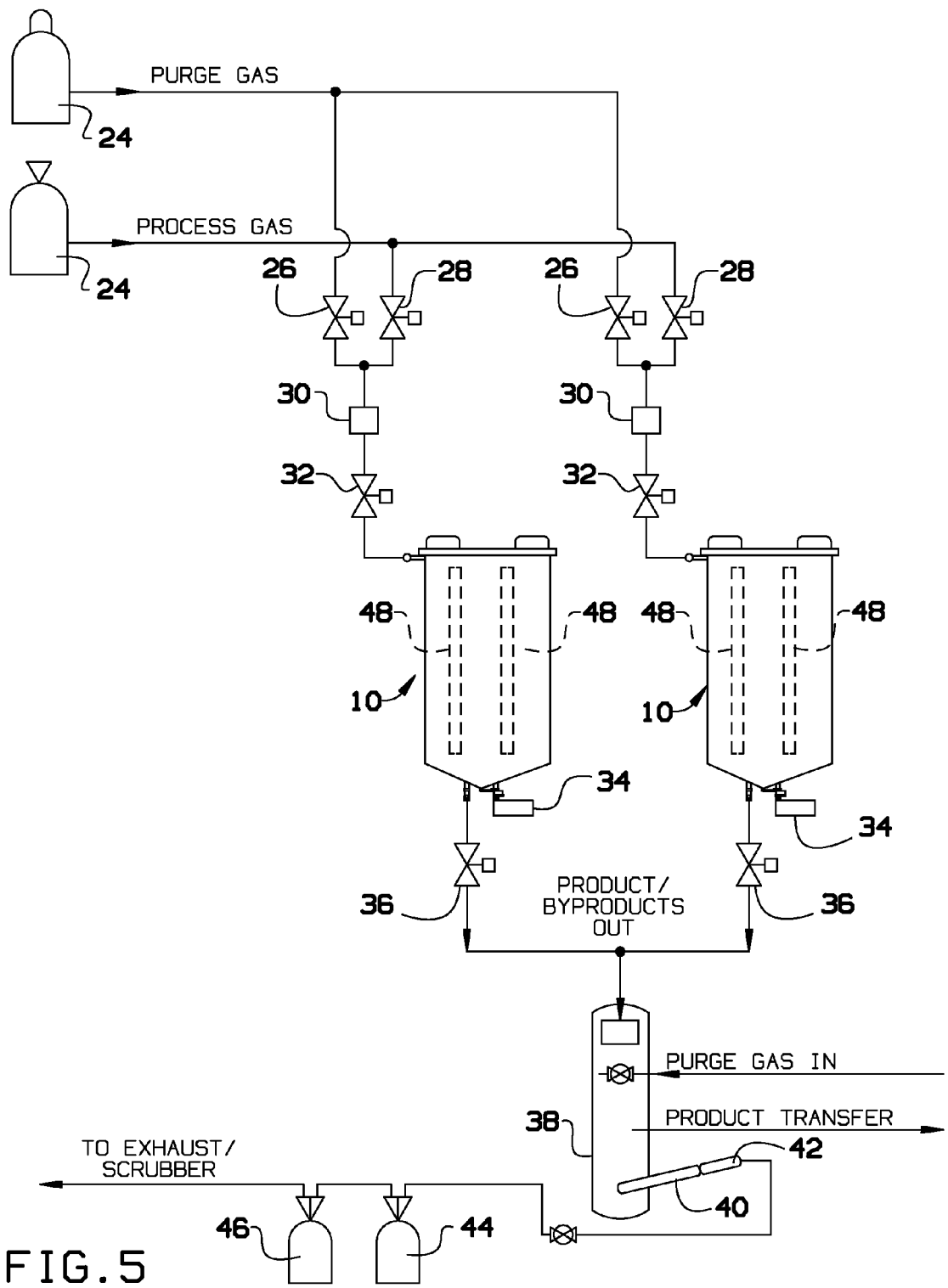
FIG. 5 is a schematic view of a chemical reactor system, using the reactor of FIG. 1, according to an exemplary embodiment of the present invention.

One or more thermowells 20 can be disposed inside the reactor body 12. The thermowells 20 can be small diameter pipes that run from back to front with drops with sealed ends to hold thermocouples or similar temperature sensors. The thermowells 20 can be open on the back side and attach to the reactor body 12 with an adjustable fitting. In this manner, the thermowell 20 can be able to be turned when the adjustable fitting is loosened in order to move the thermocouple drops out of the reactor trays 22, allowing the reactor trays 22 to be loaded and unloaded. The thermowells 20 can provide temperature sensing for reagents in the reactor trays 22 to help control the reaction. The sensors in the thermowells 20 can feed into a programmable logic controller (PLC) (not shown) that can track reaction conditions and alert a user and take appropriate action if any reaction condition is outside of a predetermined range. In addition to the thermowells 20, temperature monitoring can also be achieved with external thermocouples 48, as shown in FIG. 5 that can be attached to the top and/or bottom of each reactor body 12 so as to control external temperature controlling devices.

Various external temperature controlling devices (not shown) can be used to help control the temperature of the reactor. For example, heating rods and/or cooling jackets can be disposed around the reactors. Insulation can be disposed about these external temperature controlling devices.

A pressure gauge 34 can be attached to the reactor body 12 to measure the pressure inside the reactor body 12. The pressure gauge 34 can feed pressure data to the PLC, similar to the sensors in the thermowells 20.

A human machine interface (HMI) can be implemented with the reactor 10 to help with controlling the PLC and telling the PLC which mode to operate in, such as in a preheat mode, a run mode, a post heat mode, a cool down mode, a purge mode, an off mode, and the like). The HMI can be used to also set different run parameters and various safety factors, such as suitable out-of-control temperature ranges.

Referring now to FIG. 5, a reactor system can include one or more of the reactors 10 described above. Supply containers 24 can provide a purge gas and a process gas. The purge gas can be an inert gas, such as nitrogen gas. The process gas can be a gas, a plurality of gases, or a liquid that can be turned into a gas. The flow of the purge gas can be controlled with a purge gas valve 26. The flow of the process gas can be controlled with a process gas valve 28. The controlled flow can pass through a mass flow controller 30 that can measure the flow of gas therethrough and adjust the valves 26, 28 accordingly. A front reactor valve 32 can control flow into a reactor input 18 into the reactor 10. The valves 26, 28, 32 can be designed in various styles having various valve mechanisms. In some embodiment, the valves described herein are air-actuated, normally closed valves.

While FIG. 5 shows one container 24 for each process gas and purge gas, in some embodiments, multiple containers 24 can be used to supply various processes gases, for example. Each of the process gases can have their own process gas valve 28 to control the flow of each process gas into the reactor 10.

While FIG. 5 shows two reactors 10 disposed in parallel, in some embodiments, a single reactor 10 may be used. In other embodiments, more than two reactors 10 may be used. In some embodiments, multiple reactors 10 may be disposed in series, where an intermediate formed in an upstream reactor can be delivered to a downstream reactor, where a different reagent may be present to react with the intermediate to give a final product, for example.

A back reactor valve 36 can be deployed at an output end of each reactor 10. Products and byproducts from the reactor 10 can pass through the back reactor valve 36 and into a collection vessel 38. The collection vessel 38 can catch the material generated in the reactors 10. The collection vessel 38 can be large enough to hold the desired amount of liquid products and any liquid byproducts to be formed during synthesis. The collection vessel 38 can be chilled with a cooling jacket or similar device, if needed to condense volatile products. As shown in FIG. 5, purge gas can be used to help transfer product out of the collection vessel 38 for further use or purification, for example.

An exhaust system can include a packed column 40 on the collection vessel 38, topped with a condenser 42. A chilling fluid can be run through the condenser 42 at a set temperature to condense the products or byproducts from escaping into the exhaust. The outlet of the condenser 42 can be connected to a suitably sized glass dry trap 44, then a suitably sized liquid trap 46. The outlet of the liquid trap 46 can be vented into a local exhaust system connect to an appropriate scrubber system before being released into the atmosphere.

The reactor system of the present invention can be designed with several safety controls to prevent out-of-control events, such as, regulating the gas flow rates by maintaining a constant internal temperature, the ability to quench the system with purge gas if the reaction gets too hot or too cold, and the ability to run the system automatically 24 hours per day, without constant supervision, allowing the control system to alert an attending technician with an abnormal event occurs.

In should be noted that all valves, piping, reactor materials, vessels, containers, and the like, can be made from material that is compatible with the chemicals used in the system. Different reactors can be made of different materials, depending on the specific application. Moreover, the valves and piping can be made of different sizes, with different orifice sizes, depending on desired flow and application.

It should be understood, of course, that the foregoing relates to exemplary embodiments of the invention and that modifications may be made without departing from the spirit and scope of the invention as set forth in the following claims.

What is claimed is:

1. A chemical reactor comprising:
a reactor body;
a reactor face sealing an open face of the reactor body;
one or more reactor trays disposed in the reactor body;
one or more thermowells for measuring temperature of a reagent in the one or more reactor trays;
valves to control an inlet of the reagent into the reactor body and an outlet of product from the reactor body, wherein the reactor body is a sealed system;
a collection vessel for collection reaction products and byproducts from the reactor body;
a column and condenser connected to an exhaust of the collection vessel; and
one or more purge gas containers fluidly connected to the inlet of the reactor body.

2. The chemical reactor of claim 1, further comprising a pressure gauge operable to measure pressure inside the reactor body.

3. The chemical reactor of claim 1, wherein the one or more thermowells are movable between a first position, inserted into the one or more reactor trays, and a second position, moved out of the one or more reactor trays, the second position permitting removal of the reactor trays out of the reactor body through the open face when the reactor face is removed.

4. The chemical reactor of claim 1, further comprising a gasket for sealing the reactor face to the reactor body.

5. The chemical reactor of claim 1, further comprising one or more process gas containers fluidly connected to an inlet of the reactor body.

6. The chemical reactor of claim 1, wherein the valves include process gas valves and purge gas valves for controlling flow of material into the reactor body.

7. The chemical reactor of claim 1, further comprising a mass flow controller for measuring flow of material into the reactor body.

8. The chemical reactor of claim 1, further comprising a dry trap and a liquid trap connected to the exhaust of the collection vessel.

9. A chemical reactor system comprising:
a reactor body;
a reactor face sealing an open face of the reactor body;
one or more reactor trays disposed in the reactor body;
one or more thermowells for measuring temperature of a reagent in the one or more reactor trays;
valves to control an inlet of the reagent into the reactor body and an outlet of product from the reactor body, wherein the reactor body is a sealed system;
one or more process gas containers and one or more purge gas containers fluidly connected to an inlet of the reactor body;
a mass flow controller for measuring flow of material into the reactor body; and
a collection vessel for collection reaction products and byproducts from the reactor body.

10. The chemical reactor of claim 9, further comprising a pressure gauge operable to measure pressure inside the reactor body.

11. The chemical reactor of claim 9, wherein the one or more thermowells are movable between a first position, inserted into the one or more reactor trays, and a second position, moved out of the one or more reactor trays, the second position permitting removal of the reactor trays out of the reactor body through the open face when the reactor face is removed.

12. The chemical reactor of claim 9, further comprising a gasket for sealing the reactor face to the reactor body.

13. The chemical reactor of claim 9, further comprising a dry trap and a liquid trap connected to the exhaust of the collection vessel.

14. A chemical reactor comprising:
a reactor body;
a reactor face sealing an open face of the reactor body;
one or more reactor trays disposed in the reactor body;
one or more thermowells for measuring temperature of a reagent in the one or more reactor trays;
valves to control an inlet of the reagent into the reactor body and an outlet of product from the reactor body, wherein the reactor body is a sealed system;
a collection vessel for collection reaction products and byproducts from the reactor body; and
a column and condenser connected to an exhaust of the collection vessel.

15. The chemical reactor of claim 14, wherein the one or more thermowells are movable between a first position, inserted into the one or more reactor trays, and a second position, moved out of the one or more reactor trays, the second position permitting removal of the reactor trays out of the reactor body through the open face when the reactor face is removed.

16. The chemical reactor of claim 14, wherein the valves include process gas valves and purge gas valves for controlling flow of material into the reactor body.

17. The chemical reactor of claim 14, further comprising a mass flow controller for measuring flow of material into the reactor body.

* * * * *